July 15, 1941.   J. B. PALMER   2,249,433
REEL
Filed Aug. 8, 1940
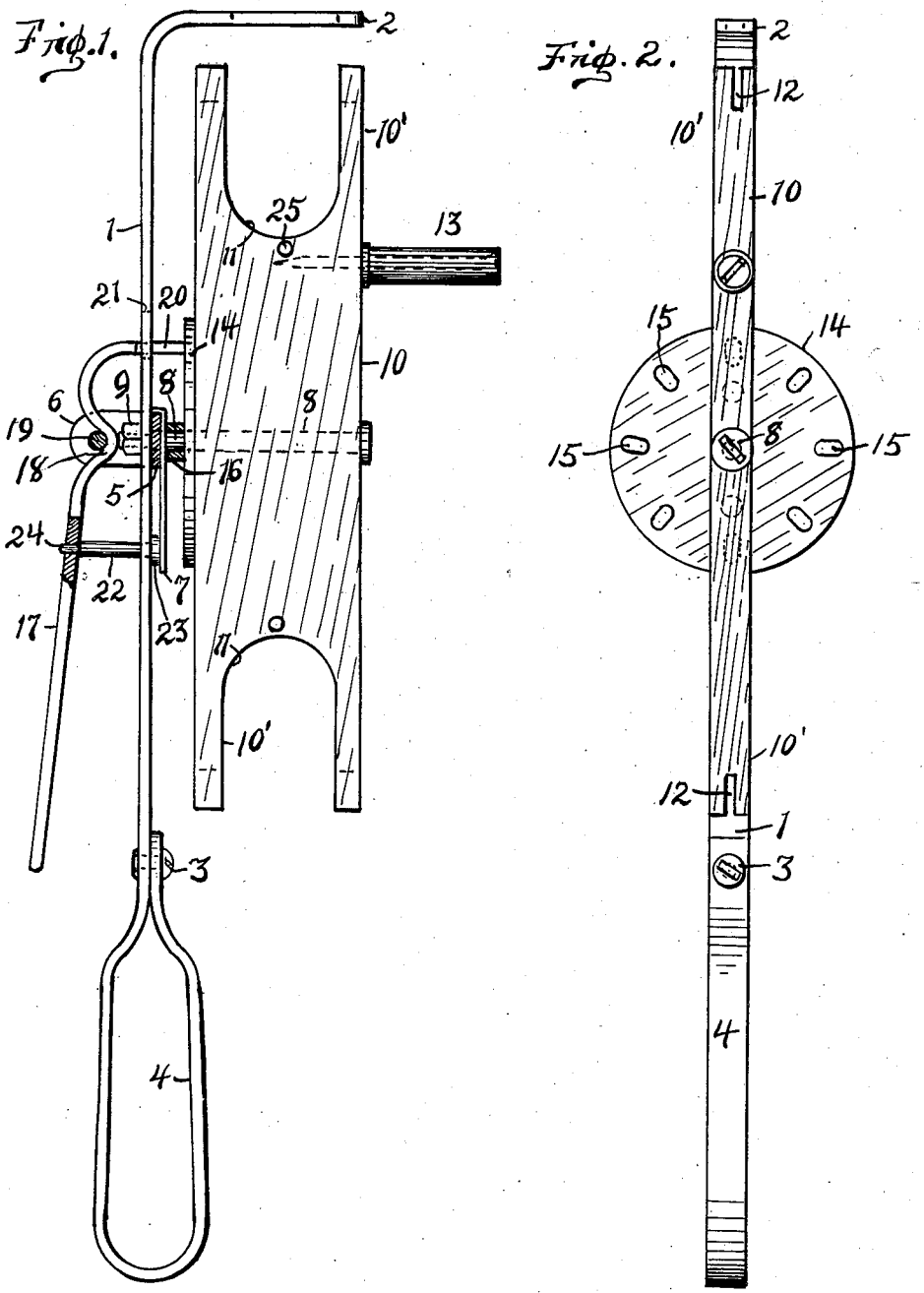
John B. Palmer INVENTOR.
BY
H. G. Burns ATTORNEY.

Patented July 15, 1941

2,249,433

UNITED STATES PATENT OFFICE 2,249,433

REEL

John B. Palmer, Fort Wayne, Ind.

Application August 8, 1940, Serial No. 351,860

4 Claims. (Cl. 242—99)

This invention relates to reels of a type operated by hand for winding and paying-out a line such as is used in flying a kite, trolling for fish, chalk lines, or cords used for various other purposes where the cord is of considerable length.

An object of the invention is to afford a reel that is readily manageable and with which a long line is rapidly wound upon the reel or paid out more or less freely to a desired extent.

And a further object of the invention is to construct the reel so that it is readily portable, compact and requires but little space when stored in a carrying case or tackle box.

Other objects and advantages of the invention appear in the following description.

An illustrative embodiment of the invention is shown in the accompanying drawing, in which—

Fig. 1 is a front elevational view of a structure in which the invention is incorporated, parts thereof being in section; and Fig. 2 is an elevational view projected from Fig. 1 in a plane at right angles thereto.

The illustrative embodiment of the invention is constituted of a staff 1 preferably formed of a flat metallic bar, one end of which has an angular slotted extension to form a line guide 2, and the opposite end of the bar is folded back upon itself with its extremity connected to the underlying part of the bar by means of a rivet 3 wherefore to provide a handle 4.

A bracket 5, preferably of U-shape having side arms 6, is positioned astride the bar 1 with the arms extending outwardly, and a brake member, consisting of a spring tongue 7, and the bracket are secured to the bar 1 by a spindle 8 the inner end of which extends through the tongue and the base of the bracket and is secured by a nut 9 so that the tongue, the bracket and the bar are firmly secured together and the spindle thereby is held rigidly in a position at right angles to the bar.

Upon the spindle is rotatably mounted a reel 10 consisting preferably of a flat elongated plate that has in each end a line-receiving recess 11, and also the extending arms 10' have narrow slits 12 through which a line is drawn to be held therein from unwinding.

The reel is provided on its outer edge with a handle 13 at a point thereon suitably spaced from the spindle, thus to form a crank for operating the reel. Upon the inner edge of the reel, concentric with the spindle, is secured a disk 14 having an annular series of latch openings 15 and provided with a hub or spacer 16 that bears loosely against the adjacent face of the spring tongue 7 by which the reel is held in a position suitably spaced from the bar 1.

In the bracket 5 between the arms thereof is secured a thumb-lever 17 having an arched portion 18 disposed loosely between the adjacent end of the spindle 8 and a pin 19 that extends through the arms 6 of the bracket. The pin serves to hold the lever against the spindle end which constitutes a fulcrum therefor. The upper end of the thumb lever is curved and provided with a finger 20 that projects loosely through a slot 21 in the bar and has engagement with one end or the other of the latch openings 15 in the disk 14, according to the angular position of the reel on its spindle. The thumb-lever 17 is held in latching engagement with the reel through action of the spring tongue 7 and a plunger pin 22 that extends loosely through the bar 1 with its head 23 resting against the spring tongue. The outer end 24 of the plunger pin is reduced in size and extends loosely through the thumb lever. When the free end of the lever is pressed partway toward the staff, the finger 20 becomes disengaged from the disk 14 permitting the reel to be turned as in winding or to run freely when the line is being paid out. When the thumb-lever is moved farther toward the staff, the spring tongue or brake member, through the medium of the plunger pin 22, is moved into contact with the adjacent face of the disk 14 thus frictionally resisting rotation of the reel to an extent according to the thumb pressure applied to the lever.

In operating the invention a line (not shown) to be reeled is strung through the line guide and is tied through an opening 25 to the reel, after which, upon manipulating the thumb-lever to release the finger from engagement with the disk 14 and rotating the reel by operating the crank handle, the line becomes wound upon the reel in its recesses. In unreeling the line, the thumb-lever is pressed inwardly so that the finger is disengaged from the disk, permitting the line to be pulled from the reel out through the line guide to an extent and with such speed as desired, the reel being rotated by the pull of the line. Over-running by the reel while the line is being paid out is obviated by applying thumb pressure to the lever sufficiently to cause the brake-member to engage the reel disk.

Variations from the particular construction above disclosed may readily be made by exercise of engineering skill without departure from the spirit or scope of the invention, and the following claims are intended to be inclusive of such variations.

What I claim is:

1. In a line reeling appliance, a staff having a line guide at one end thereof and a handle at the other, a bracket on the staff, a spring tongue adjacent the base of the bracket, a spindle one end of which projects through said tongue, base and staff and provided with a nut the arrangement being such as to secure the parts together, a reel rotatably mounted on said spindle alined with said guide, said reel having upon one edge thereof a crank handle and upon its opposite edge a disk concentric with the spindle and provided with an annular series of latch openings, a thumb-lever mounted for pivotal movement in said bracket and provided with a finger for engagement in said openings, and a plunger pin extending loosely through the staff and lever with its head bearing against said tongue whereby said tongue is moved into frictional contact with said disk when said lever is moved out of engagement with said disk.

2. A line reeling appliance consisting of a staff provided with a spindle and a line guide, a reel mounted for rotation on said spindle, alined with said guide and provided with a crank handle, a perforated disk secured to said reel located concentric with said spindle in a plane adjacent to and spaced apart from said staff, a spring tongue positioned in the space between the disk and staff, a thumb-lever pivotally mounted in connection with the staff provided with a finger for locking engagement with said disk when in one position, and a plunger pin extending loosely through the staff and lever with its head against said tongue whereby the lever is held in locking position by action of said tongue and said tongue is moved into frictional engagement with said disk when said lever is moved out of locking position.

3. A line reeling appliance having a staff provided with a spindle and a line guide, a reel rotatable on said spindle, alined with said guide, provided on its outer end with a crank handle and having secured to its opposite edge a disk concentric with said spindle, a spring tongue supported in connection with said staff, a movable portion of said tongue overlapping and normally spaced apart from said disk, a thumb-lever mounted in connection with said staff for pivotal movement and having locking engagement with said disk when the lever is in a selected position, and a plunger pin disposed between the movable part of said tongue and the lever through the medium of which the lever is held in locking engagement by the spring action of the tongue and said tongue is moved into frictional contact with said disk upon movement of the lever into another selected position.

4. A line reeling appliance constituted of a staff provided with a reel-supporting spindle, a reel rotatable on said spindle provided with a crank handle on its outer edge and a disk secured to its inner edge concentric with said spindle, a pivoted lever in connection with said staff engageable with said disk to lock same, a spring tongue mounted in connection with the staff and frictionally engageable with said disk, and a member operatively connecting the spring and lever whereby the lever and tongue are moved selectively into engagement with said disk.

JOHN B. PALMER.